United States Patent

Monahan

[11] 4,053,203
[45] Oct. 11, 1977

[54] AUTOMATIC CENTERING

[75] Inventor: John F. Monahan, Quincy, Ill.

[73] Assignee: Harris Corporation, Cleveland, Ohio

[21] Appl. No.: 643,169

[22] Filed: Dec. 22, 1975

[51] Int. Cl.² ............................................. H04N 9/16
[52] U.S. Cl. ............................................. 358/51
[58] Field of Search ........................ 358/51, 209, 217; 315/9, 399, 370

[56] References Cited

U.S. PATENT DOCUMENTS

| 3,830,959 | 8/1974 | Dischert et al. | 358/51 |
| 3,903,472 | 9/1975 | Wahl | 325/392 |
| 3,925,812 | 12/1975 | Blom et al. | 358/51 |

Primary Examiner—John C. Martin

[57] ABSTRACT

Automatic centering apparatus for use in a television camera having first and second video pickup devices for registering the video signals produced thereby. A first delay circuit responds to the first video signal to provide a first delayed signal, and a second delay circuit responds to the second video signal to provide a second delayed signal. The second delay circuit provides a time delay substantially equal to twice the delay provided by the first delay circuit. If the undelayed first and second video signals are registered properly, the delayed and undelayed second video signals are misregistered by equal yet opposite amounts from the first delayed signal. Relative misregistration of the two signals is detected by subtracting the delayed first video signal from the delayed and undelayed second video signals, and then clipping, integrating and comparing the two difference signals. Two comparator outputs indicate respectively when the first clipped and integrated signal is higher than the second, and when the second clipped and integrated signal is higher than the first. These two comparator outputs control the changes in amplitude of an analog output signal which serves as the registration correction signal for one of the two video pickup devices.

17 Claims, 13 Drawing Figures

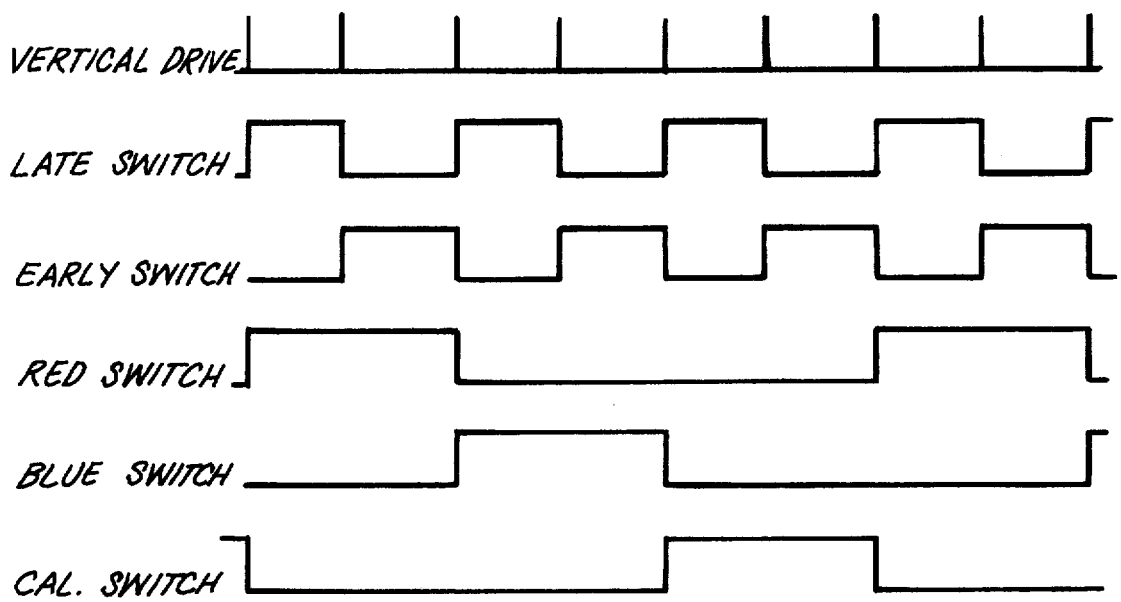
FIG. 10a
FIG. 10b
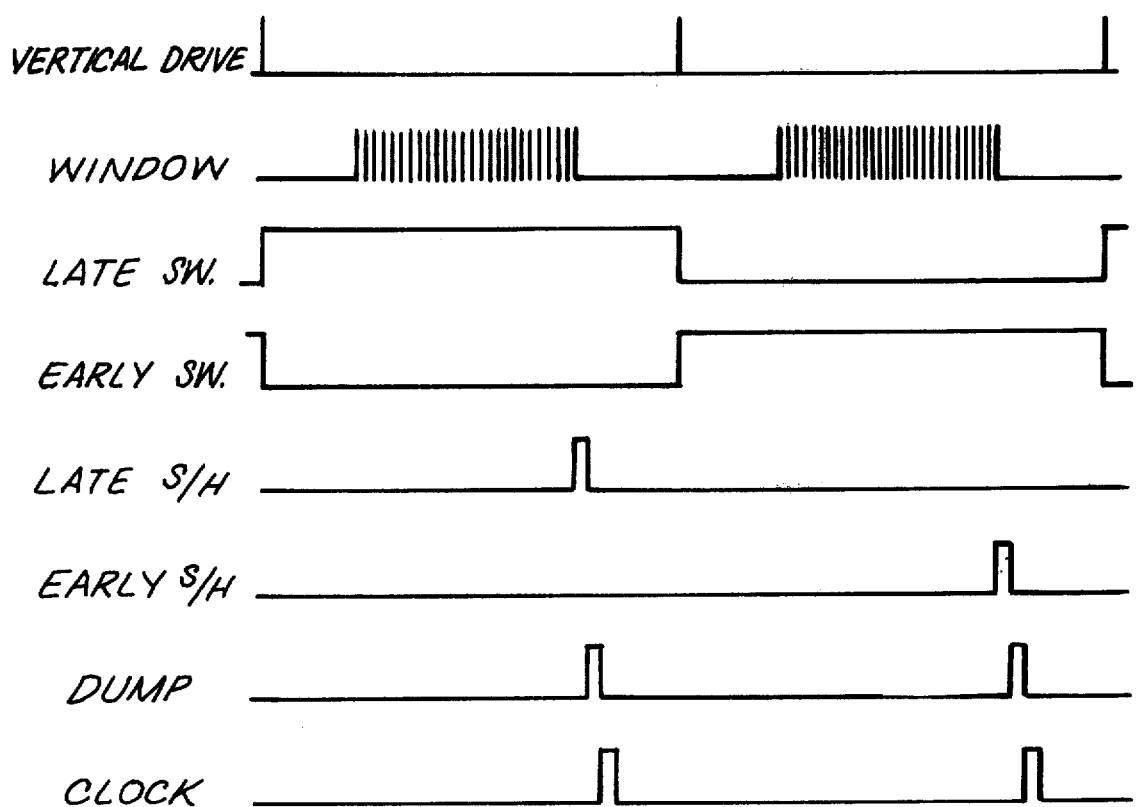

AUTOMATIC CENTERING

The present invention relates to the art of television cameras and more particularly to the art of automatic registration of color television cameras.

In the current state of the art, detection of a full color scene requires two or more image pickup devices. The same scene is simultaneously focused on the imaging surface of each device. Each pickup device then scans its respective imaging surface to produce a video signal corresponding to the image focused thereon.

The occurrence of these video signals must be synchronized so as to simultaneously convey information relating to the same portion of the focused image. The relative centering of the signals can be altered in a variety of ways, usually by changing the relative positions of the area scanned and the focused image in the misregistered pickup device. Although this can be accomplished by moving the focused image on the imaging surface of the pickup device, the generally accepted manner is to move the area scanned so as to coincide with the areas scanned by the other imaging tube at the same time. In vidicon tubes this can be accomplished, for example, by adding a DC level to the horizontal and vertical deflection systems so as to thereby move the portion of the imaging surface scanned to the left, right, up or down.

Regardless of the method used to alter the relative registration of the signals, means must be provided for controlling such alteration so as to provide the necessary centering. While this can be controlled manually, such manual control is generally unacceptable because of its inherent slower response, nonuniformity, and inaccuracy. Consequently, automatic means for controlling the registration of the video signals is necessary. An example of a prior art system of this type is described in U.S. Pat. No. 3,830,959.

It is therefore an object of the present invention to provide automatic centering apparatus for a television camera having a plurality of image pickup devices.

It is another object of the present invention to provide accurate, yet simple and inexpensive control of the registration of the video signals.

It is still another object of the present invention to provide digital apparatus for automatically centering a plurality of video signals.

It is yet another object of the present invention to provide automatic centering apparatus including an automatic calibration feature.

In accordance with the present invention, apparatus is provided for automatically registering a plurality of video signals. A first video signal is delayed by a first fixed amount to provide a first delayed signal, and a second video signal is delayed by a second fixed amount equal to twice the first fixed amount to provide a second delayed signal. The delayed and undelayed second video signals thus represent misregistered signals with respect to the first delayed signal. If the undelayed first and second video signals are centered properly, the delayed and undelayed second video signals are misregistered by equal yet opposite amounts from the first delayed signal. An analog output signal is provided which responds to the relative misregistration thereof. Thus, means are provided for increasing or decreasing the analog output signal in response to a difference in misregistration in a first or second direction, respectively. The analog output signal serves as the registration control signal for one of the two video signals.

DESCRIPTION OF THE PREFERRED EMBODIMENT

Figure 1:
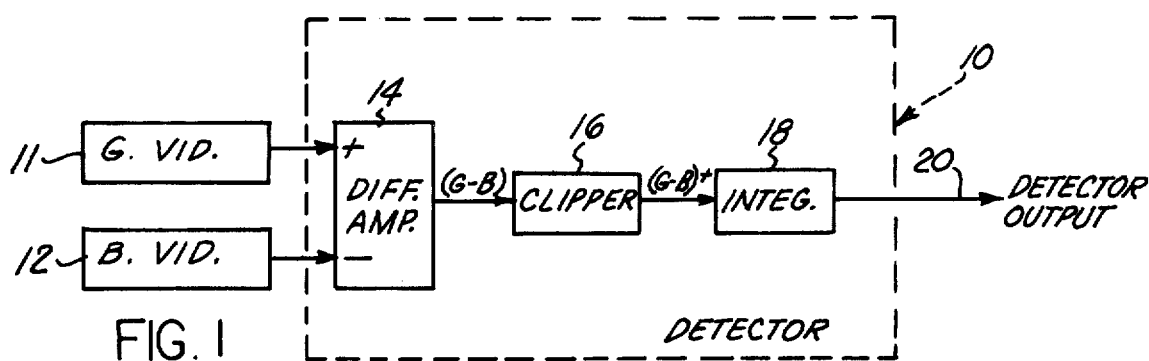
Figure 2:
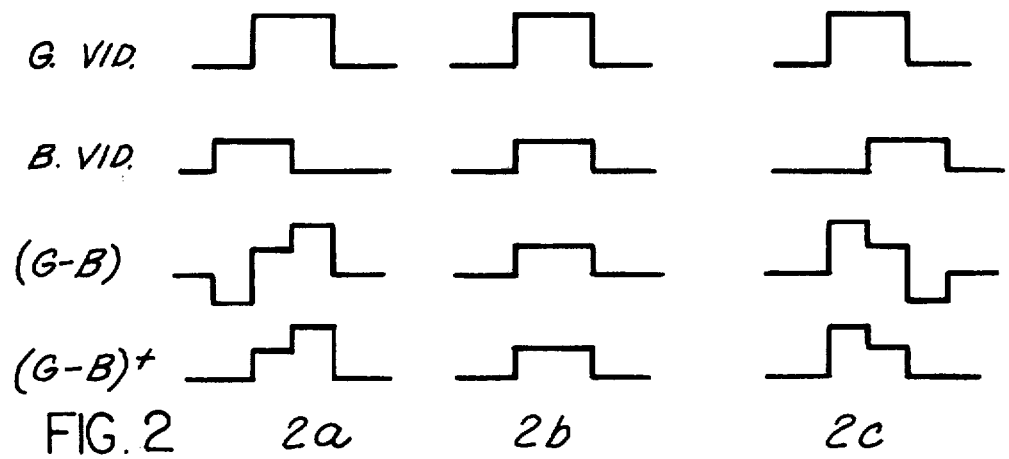
Figure 3:
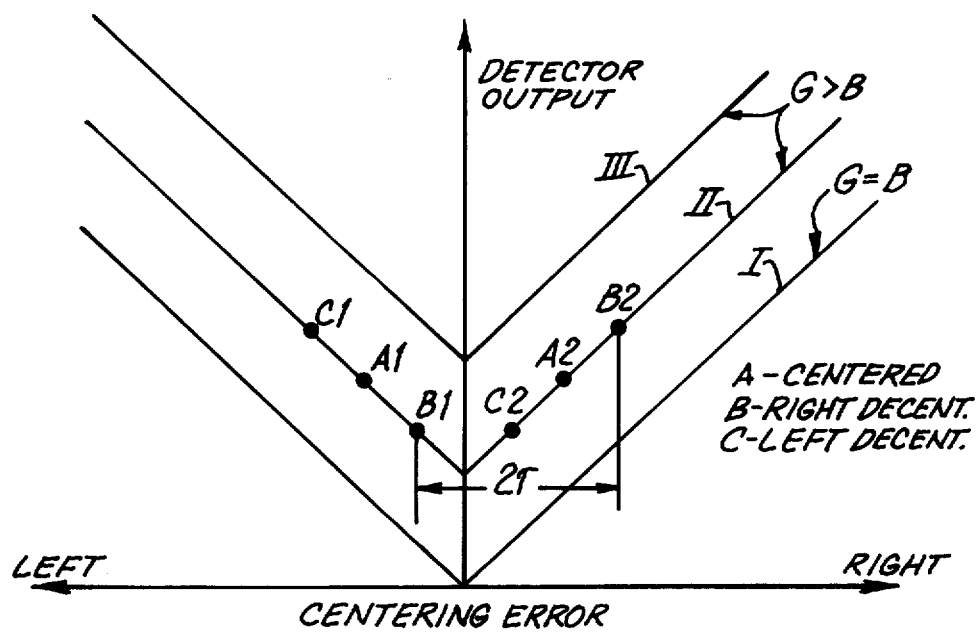
Figure 4:
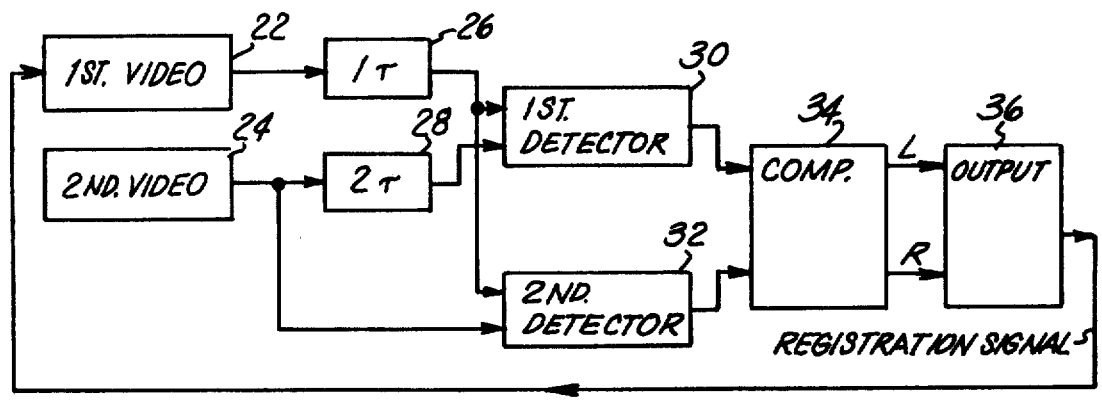
Figure 6:
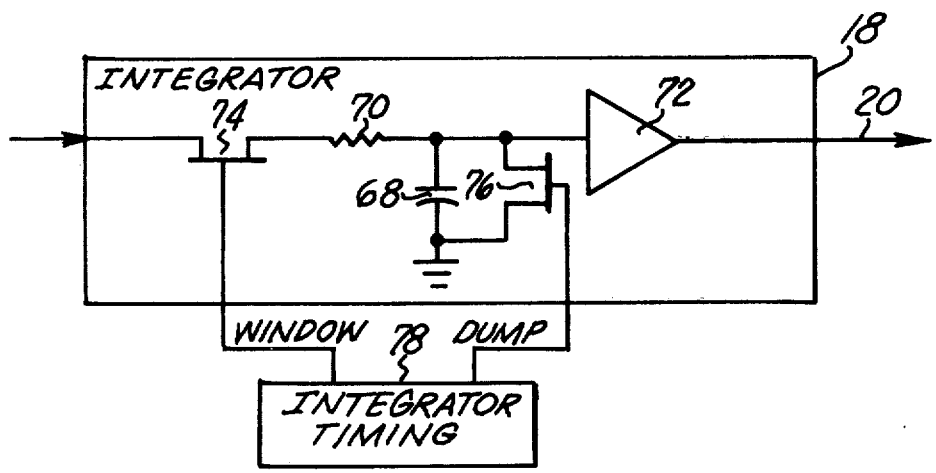
Figure 8:
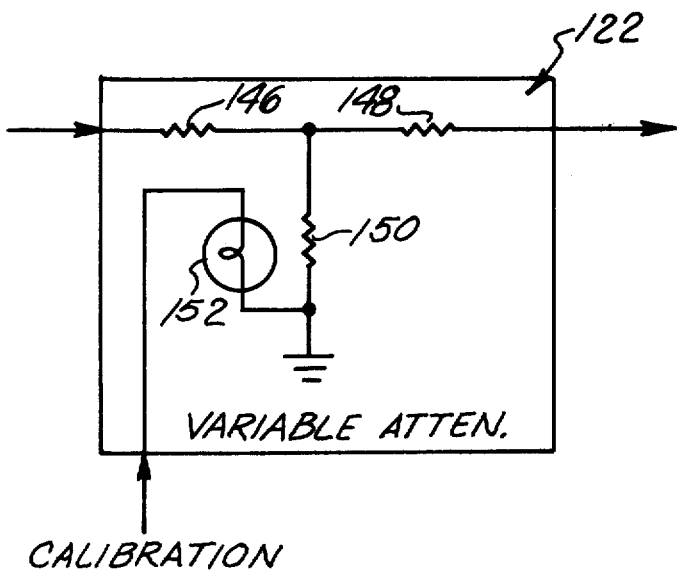
Figure 5:
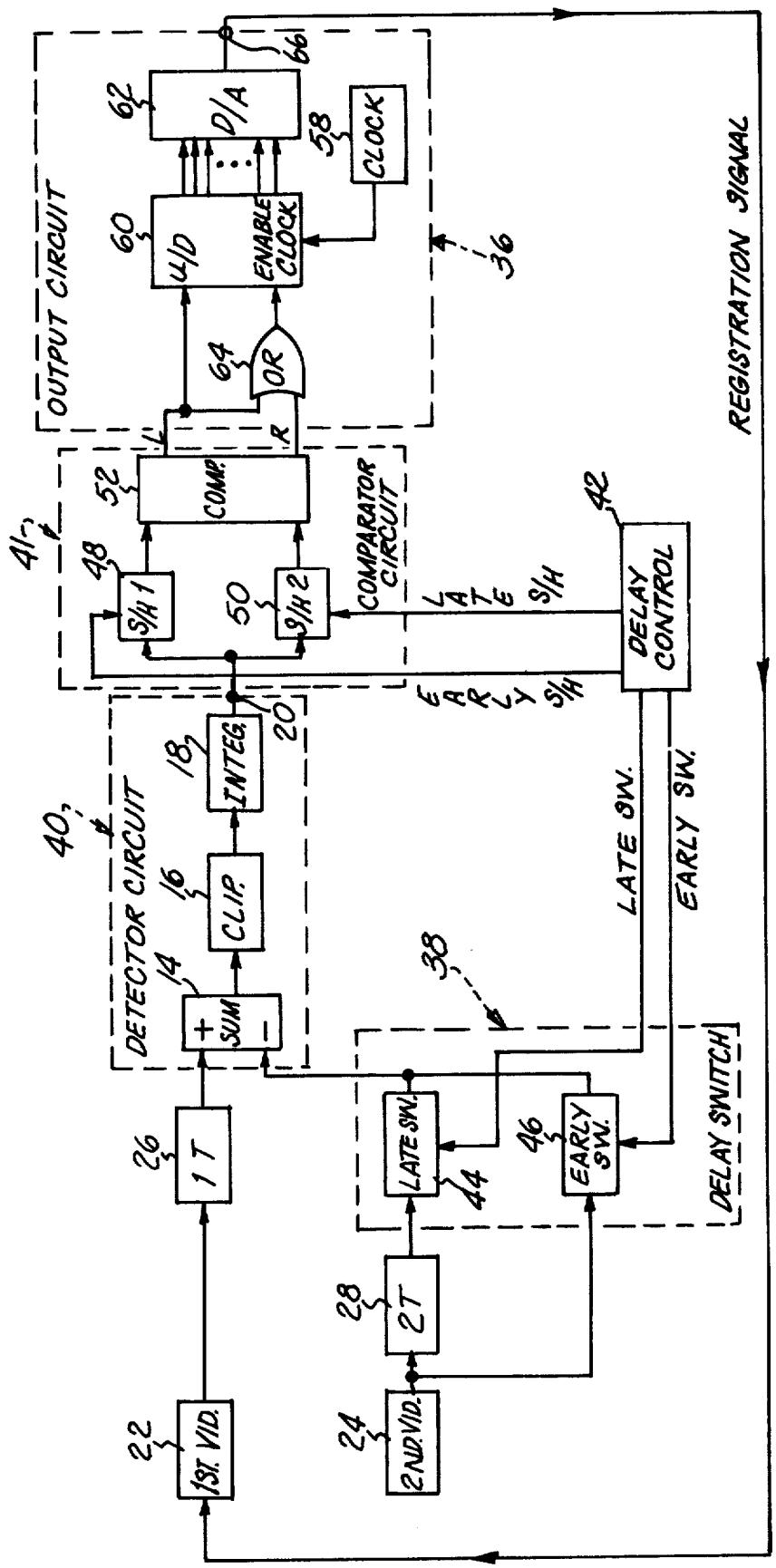
Figure 7:
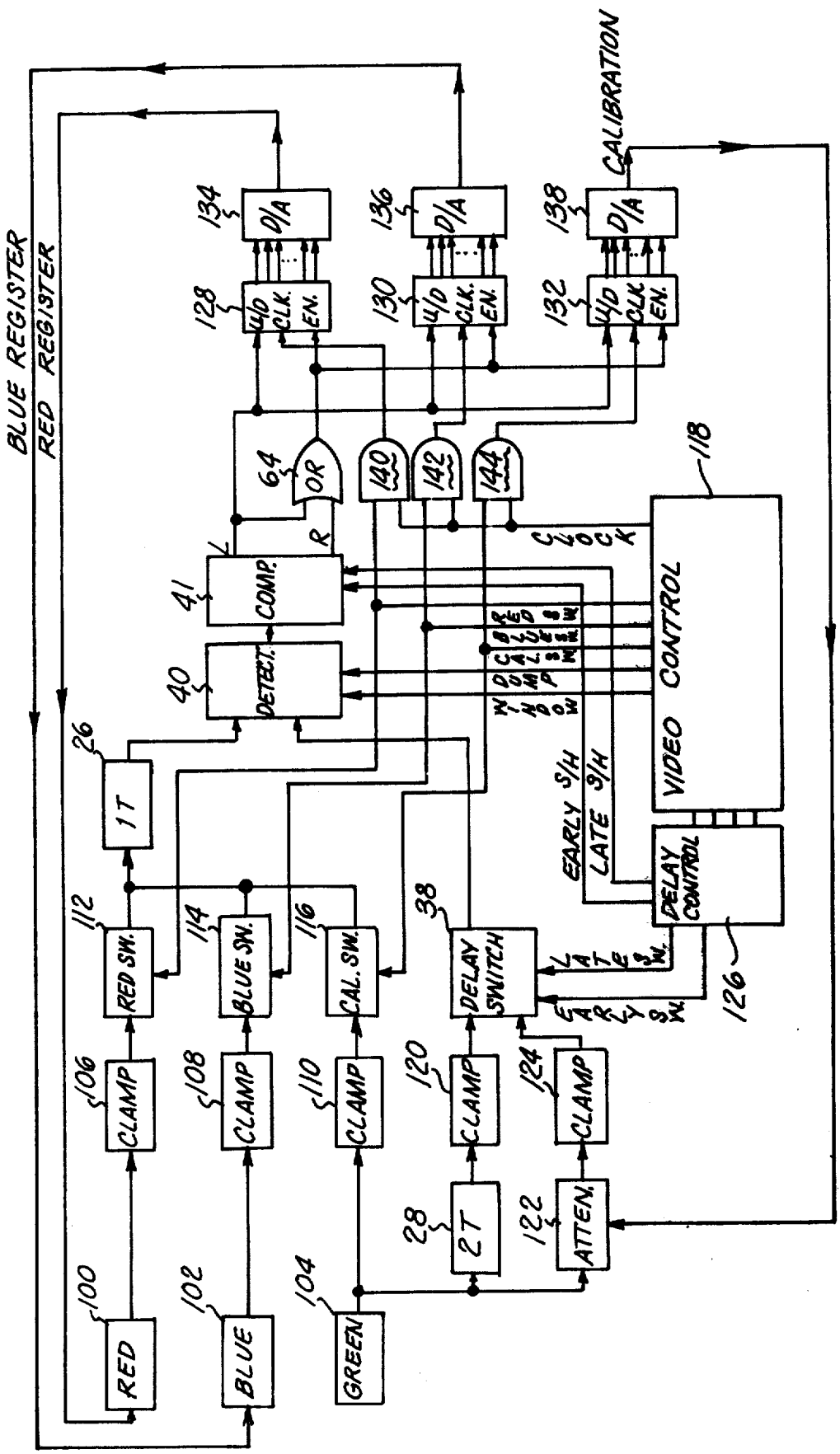
Figure 9:
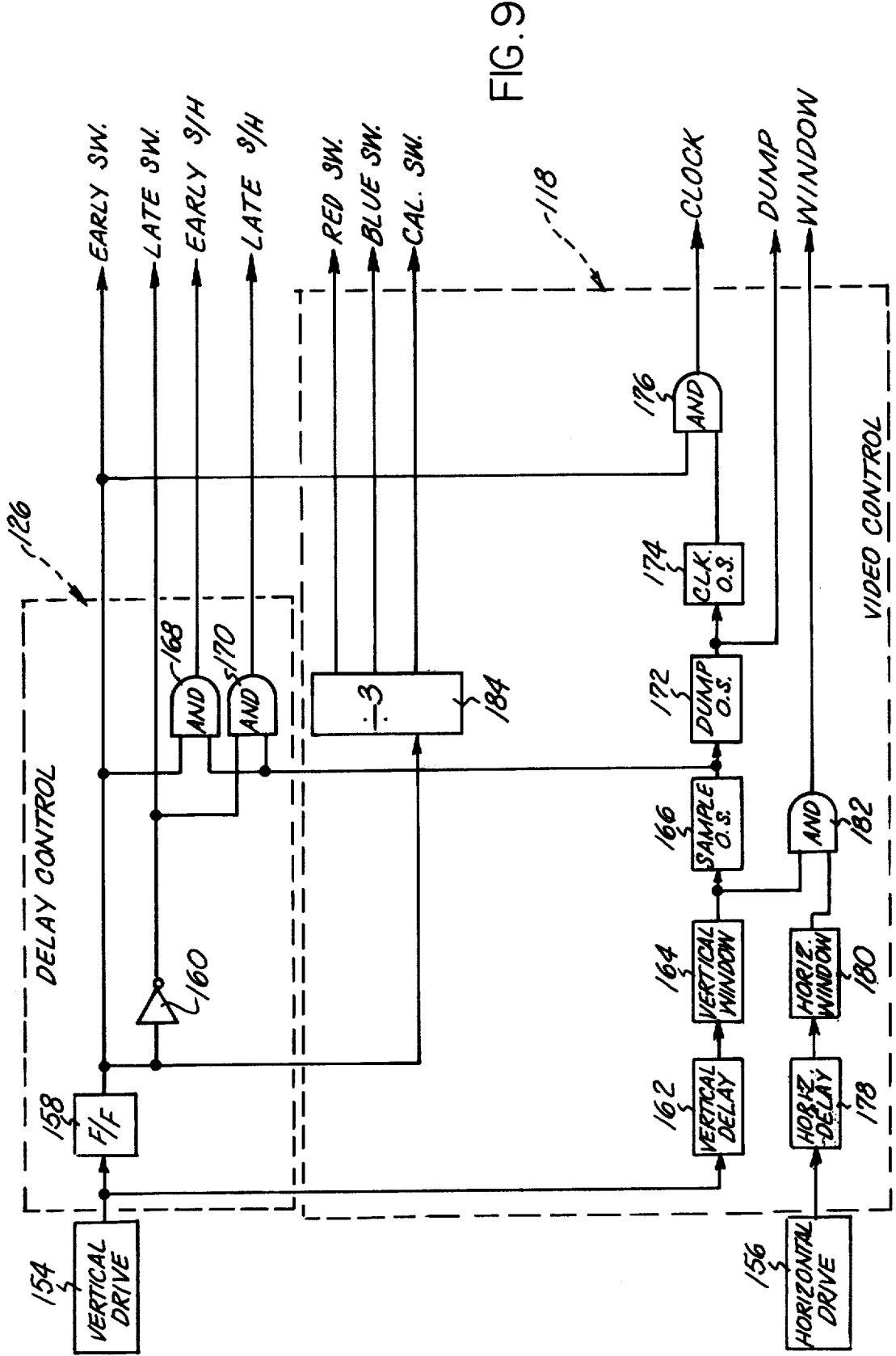

The foregoing and other objects and advantages of the invention will become more readily apparent from the following description of the preferred embodiment of the invention, as taken in conjunction with the accompanying drawings which are a part hereof and wherein:

FIG. 1 is a block diagram of the basic detector circuit utilized with the present invention, FIGS. 2a, 2b and 2c graphically depict exemplary waveforms found in the detector circuit of FIG. 1 for various centered and decentered conditions, FIG. 3 graphically depicts the transfer characteristics of the detector of FIG. 1 for various centering errors, FIG. 4 is a basic operative diagram of a first embodiment of the present invention, FIG. 5 is a block diagram of a second embodiment of the present invention for centering two video signals, FIG. 6 is a schematic representation of the integrator block of the embodiment pictured in FIG. 1, 4, and 5, FIG. 7 is a block diagram of a third embodiment of the present invention for centering three video signals and including an automatic calibration loop, FIG. 8 is a schematic representation of the variable attenuator block of the embodiment pictured in FIG. 7, FIG. 9 is a more detailed block diagram of the video control and delay control blocks of the embodiment pictured in FIG. 7, and FIGS. 10a and 10b are graphical illustrations of the relative timing with the embodiment pictured in FIGS. 5 through 9.

For the purpose of this disclosure, the terms "centering" and "registration" are used interchangeably. Also, a high level is defined as a logic "1" and a low level is defined as a logic "0".

Referring now specifically to FIG. 1, the basic detector circuit 10 is set forth. The detector is comprised of video signal sources 11 and 12, a differential amplifier 14, clipper 16 and integrator 18 to produce a detector output 20. The detector circuit will be described with specific reference to the waveforms of FIG. 2, and attention is directed thereto for a more complete understanding of the circuit. Video sources 11 and 12, which may conveniently represent the imaging apparatus of a color television camera, produce video signals which must be centered with respect to one another. These video signals are shown for the purposes of illustration as square waveforms of dissimilar amplitude in FIGS. 2a, 2b and 2c. These signals are first directed to differential amplifier 14. If, as shown in FIG. 2b, the video signals are centered with respect to one another, the output of differential amplifier 14, which is a difference signal (G-B), is relatively constant. For decentered cases represented by FIGS. 2a and 2c the output of differential amplifier 14 has positive and negative portions. This output is directed to clipper 16 which may be designed to extract either the positive or the negative information from the signal. By way of example the clipper circuit 16 is shown as extracting the positive information while discarding the negative information. The output of clipper 16 is identified in FIGS. 2a, 2b and 2c as the (G-B)+ waveform. It will be seen that this waveform has positive lobes for the decentered cases which are not found in the centered case. The presence of these lobes is detected by a standard integrator circuit 18 which integrates the signal seen at its input to produce the detector output characteristics shown in FIG. 3. From the foregoing it will be apparent that the detector output will have a minimum value when the two video signals are centered with respect to one another, and will have a relatively higher value whenever the two video signals are not so centered. If the two video signals are of equal amplitude, transfer characteristic I in FIG. 3 results. But if, for example, the video signal produced by video signal source 11 were larger than the video signal produced by video signal source 12 the transfer characteristics indicated by II or III would result. In all cases, the detector output will be at a minimum when the centering error is zero. Thus the detector output depends not only on the centering error but also on the relative magnitude of the two video signals being tested. Because of this, the existence and direction of a centering error can only be determined by "hunting"; that is, by altering the relative centering of the two signals and examining the variations in detector output which result.

Referring now to FIG. 4 the general operation of the present invention is described. The present invention avoids the hunting required in the use of the detector pictured in FIG. 1 by producing equally and opposingly decentered signals to provide two detector outputs which can be compared to determine the direction and existence of a centering error. Thus the invention is comprised generally of first and second video signals sources 22 and 24, first and second delays 26 and 28, first and second detectors 30 and 32, comparator 34, and output circuit 36. Detectors 30 and 32 are each similar to detector 10 in FIG. 1. The output of first video signal source 22 is directed through first delay 26 to produce a first delayed signal. This signal is directed to both first and second detectors 30 and 32. The second video signal is directed to second detector 32 and through second delay 28 to produce a second delayed signal which, in turn, is directed to first detector 30. First and second delays 26 and 28 serve to delay their respective input signals by fixed amounts, as by delay lines. Second delay 28 operates to delay the second video signal by an amount substantially twice the amount of the delay introduced by delay circuit 26. The delayed and undelayed versions of the second video signal thus represent artificially decentered signals with respect to the delayed first video signal. If the first and second video signals are centered with respect to one another, the delayed and undelayed second video signals will be decentered in opposite directions but by equal amounts from the first delayed signal. Since the transfer characteristics of detectors 30 and 32 are symmetric with respect to zero centering error, the output of the two detectors will be of equal magnitude. Referring back to FIG. 3, and assuming that the relative magnitudes of the two video signals place the operation of the detectors on transfer characteristic II, the output amplitude of detectors 30 and 32 may be represented respectively by points A1 and A2 thereon. If the first video signal is decentered to the right with respect of the second video signal, the output of detectors 30 and 32 will shift to points represented respectively by B1 and B2. If a left decentering condition occurs the output of detectors 30 and 32 will shift to points respectively represented by C1 and C2. It is thus apparent that a comparison of the outputs of detectors 30 and 32 will produce information about the existence and direction of a centering error.

The outputs of detectors 30 and 32 are therefore directed to comparator 34 which has two outputs L and R which respond to the relative amplitudes of the detector outputs. Comparator 34 is a standard comparator circuit which has a small "dead" zone such that as long as the two outputs are approximately equal, outputs L and R will remain in a first state, e.g. at a digital "0" level. If the output level of detector 32 rises significantly above that of detector 30, output R of comparator 34 will respond by changing states, e.g. by shifting to a digital "1" level. If the output level of detector 30 rises significantly above that of detector 32, output L of comparator 34 will respond by similarly changing states. The comparator outputs are directed to an output circuit 36 which may be digital or analog in nature. A registration signal is provided by output circuit 36, which signal responds to the comparator outputs by increasing or decreasing in magnitude whenever a left or right decentered condition occurs. This signal is directed back to one of the video signal sources to correct registration errors in a manner not relevant to the present invention as, for example, in the manner previously described. Automatic centering is thereby achieved.

FIG. 5 sets forth a preferred embodiment of the present invention wherein the use of a single detector is time shared between the two decentered conditions. Once again first and second video signals 22 and 24, first and second delays 26 and 28, and output circuit 36 are utilized. Additional elements of the circuit include delay switch 38, a single detector circuit 40, another comparator circuit 41, and delay control circuit 42. The delayed and undelayed second video signals are directed respectively through late switch 44 and early switch 46 of delay switch 38 to a common input line to detector 40. These switches may conveniently comprise field effect transistors (FET's) with corresponding gating circuitry. The late switch 44 and the early switch 46 are alternately energized by delay control circuit 42 to provide first the delayed and then the undelayed second video signals on the input line to detector circuit 40. The first delayed signal is directly connected to the other input of detector circuit 40. The output of detector circuit 40 is thus timed shared between two detector output conditions. Since these detector output signals must be compared, a comparator circuit 41 includes first and second sample/hold circuits 48 and 50 to retain each signal for comparison purposes. The action of these circuits is controlled by delay control circuit 42 such that the sampling of output 20 of the detector circuit 36 by sample/hold circuits 48 and 50 is in timed relation with the actuation of late and early switches 44 and 46. The outputs of sample/hold circuits 48 and 50 thus correspond to the outputs of first detector 30 and second detector 32 of FIG. 4. These outputs are compared by comparator 52, substantially identical to comparator 34 of FIG. 4, which has outputs L and R indicating left and right decentered conditions. These outputs control an output circuit 36 shown herein as digital in nature and comprised generally of a clock 58, digital up/down counter 60, digital to analog converter 62, and OR gate 64. Comparator 52 is structured such that, as previously described, a centering error produces a digital "1" condition on either output L or R. Digital OR gate 64 responds to outputs L and R by enabling up/down counter 60 to count clock pulses produced by clock 58. The direction of the count is controlled by the up/down input to up/down counter 60 which is connected to one of the outputs L of comparator 52. As long as the decentered condition persists, up/down counter 60 will be enabled to count clock pulses produced by clock 58, thus changing the state of its digital output. The digital output of up/down counter 60 is directed to digital to analog converter 62 which converts the digital signal into a corresponding analog signal on its output 66. The analog output of output circuit 36 is again directed to the registration control input of video signal source 22.

In operation, a registration error between the two video signals produces divergent outputs from sample/-hold circuits 48 and 50. Comparator 52 senses this condition and causes either output L or R to go to a digital "1" state. OR gate 64 responds by enabling the clock to count in an upwards or downwards direction in dependence upon the output L of comparator 52. The output state of up/down counter 60 thus changes continually as long as the misregistration persists. Digital to analog converter 62 converts the changing digital signal into a changing analog signal on its output line 66. This changing analog signal, serving as the registration control input to one of the video signal sources, thus causes a corresponding change in the relative centering of the two video signals and brings the two signals back within registration. When this occurs the output to comparator 52 which was in a digital "1" state will return to a digital "0" state thus disabling up/down counter 60 from continuing its count and holding the analog registration signal at its current value.

FIG. 6 schematically details the contents of the integrator block 18 of detector circuit 40. The circuit includes a capacitor 68 fed by a resistor 70. In a well-known manner, these two elements cooperate to provide a signal across capacitor 68 which corresponds to the integral of the input voltage. This voltage is directed to other circuit elements through buffer amplifier 72. Control of integrator 18 is achieved through two FET's 74 and 76 which respectively control the responsive time of the integrator and the dumping of the storage element 68. Since the video signals of greatest interest are those corresponding to the center of the subsequently displayed image, the input to the integrator is gated by FET 74 such that it responds only to those signals representing center picture signals. Control of FET 74 is achieved by integrator timing circuit 78 (not shown in FIG. 5) which provides a WINDOW output for this purpose. Since the integrator is time shared, the signal stored by capacitor 68 must be removed prior to its being used for the next signal. This is accomplished through FET 76 which is connected in parallel across capacitor 68 and is controlled by a DUMP output of integrator timing circuit 78. The timing of this and other components will be shown in greater detail as the disclosure is more fully made.

FIG. 7 illustrates a preferred embodiment of the invention for controlling the registration of three or more video signals and including an automatic calibration control. Although the description will be provided with reference to three video signals, it will be appreciated that the concepts can be expanded to cover an indefinite number of video signal sources. Component blocks of FIG. 7 which are identical to corresponding blocks of FIG. 5 are numbered identically. Three video sources 100, 102 and 104 are included, each having its respective clamp circuit 106, 108 and 110, and switch circuit 112, 114, and 116. Clamp circuits 106, 108 and 110 are of a type well known in the art and are included to provide a uniform D.C. reference level, or "black" level, for the video signals.

The output of switches 112, 114 and 116 are connected in common to the first delay circuit 26. The three switches are controlled by video control circuit 118 which functions to successively energize each of the three switches for a fixed time interval. For the convenience of description, video control circuit 118 is represented as a unitary control and includes within its bounds both the integrator timing circuit and the clock, as well as the video switch controls.

Video signal source 104 is also directed to second delay circuit 28 which in turn is connected through clamp 120 to delay switch 38. The output of video signal source 104 is further directed through attenuator 122, clamp circuit 124, and again into delay switch 38. Clamp circuits 120 and 124 are similar to clamp circuits 106, 108, and 110. The delay switch 38 is again controlled by a delay control circuit 126; also, the outputs of delay switch 38 and first delay circuit 26 are again directed to detector 40 which in turn is connected to comparator 41. Video control 118 provides WINDOW and DUMP outputs of detector 40. Delay control circuit 126 provides EARLY sample/hold and LATE sample/hold pulses for comparator 41. Count control is again provided by one output of comparator circuit 41 and the output of OR gate 64. These count control outputs are jointly directed to up/down counters 128, 130, and 132. Each up/down counter has its respective digital to analog converter 134, 136 and 138. Although the count control inputs to the up/down counters 128, 130 and 132 are controlled in unison, the clocks are separate and are provided by two-input AND gates 140, 142 and 144, respectively. The video control circuit 118 provides the three video switch outputs and a clock output. The clock is jointly directed to one input of each of the AND gates. Each of the video switch outputs is individually directed to the other input of a respective AND gate. The video switch outputs of video control circuit 118 thus jointly control video switches 112, 114 and 116, and the application of clock pulses to up/down counters 128, 130 and 132. Because of this, and further because only one of the video outputs is energized at any given time, each up/down counter 128, 130, or 132 responds to misregistration of only its corresponding video signal. The output of video signal source 104 is arbitrarily chosen herein as the reference signal with which the other two signals are registered. Consequently, the registration inputs of video signal sources 100 and 102 are connected to the outputs of the corresponding digital to analog converters 134 and 136.

Since the output of the reference video signal source 104 is, obviously, in registry with itself, any variations in the output of its corresponding digital to analog converter 138 result from drift of the operative circuit elements. This drift is compensated for by connecting the output of digital to analog converter 138 to the control input of variable attenuator 122. The details of variable attenuator 122 are schematically shown in FIG. 8.

Variable attenuator 122 is comprised of resistors 146 and 148, connected in series between the signal input and signal output thereof, and resistor 150 which shunts the junction of resistors 146 and 148 to ground. Resistor 150 is a light sensitive element and is optically coupled to light source 152, connected to the calibration input. By increasing the signal on the calibration input, the light emitted by light source 152 is increased and the resistance of light sensitive element 150 is decreased. In this way the resistance of element 150 is controlled by the signal on the calibration input. This, in turn, controls the gain of attenuator 122 by shunting controlled amounts of the input signals to ground.

A more detailed representation of video control 118 and delay control 126 is illustrated in FIG. 9. For a more complete understanding of the operation and relative timing thereof, attention is directed to the timing diagrams of FIG. 10 (a) and 10 (b). These circuits control virtually all of the timing of the automatic centering circuit, and are responsive to vertical drive signal 154 and horizontal drive signal 156 to provide this timing. These drive signals correspond to the vertical and horizontal scanning frequencies of the television camera, and are composed of periodic sequences of pulses produced at those respective frequencies. The vertical drive signal is fed into a flip-flop 158 which responds to consecutive vertical drive pulses by changing its output from one digital state to another.

The output of flip-flop 158 is used to control early switch 46 and late switch 44. Thus each switch is alternately energized for one "field" of the video signal. The term "field" refers to the period between consecutive vertical drive pulses. The late switch signal is the logic inverse of the early switch signal and is provided by inverter 160. The vertical drive signal is also directed to a vertical delay one shot 162 which is in turn connected to vertical window generator 164. Vertical delay signal 162 delays the actuation of vertical window 164 to bring the output pulse thereof within the center picture area of the video signal. This, and all other one shots pictured herein, triggers on the falling edge of the input signal. Thus, sample one shot 166 triggers at the end of the vertical window pulse to provide a sample pulse which is gated by AND gates 168 and 170 to comparator circuit 41. The output of sample one shot 166 is also directed to dump one shot 172 which provides a signal which dumps the storage element of integrator 18. Dump one shot 172 also controls clock one shot 174 which provides a single clock pulse for every field of the video signal. The clock pulses are gated by AND gate 176 such that pulses are provided to the digital counters only in every other field. The horizontal drive signal produced by horizontal drive signal source 156 is directed to horizontal delay one shot 178 which serves the same purpose in the horizontal direction as vertical delay one shot 162 serves in the vertical direction. The output of horizontal delay 178 is connected to horizontal window circuit 180 which provides a horizontal window corresponding to the horizontal center picture signal. The horizontal window and the vertical window are conjunctively joined to provide a WINDOW output by AND gate 182. The output of flip-flop 158 is additionally connected to a three state ring counter 184 to provide the three video switch outputs.

In operation, the timing sequence is as follows. Assume the output of flip-flop 158 is high. Vertical drive signal 154 pulses flip-flop 158 which drops low, triggering ring counter 184 and enabling the late switch. The vertical drive pulse also triggers the vertical delay one shot 162 which in turn triggers the vertical window generator 164. During the course of the vertical window the integrator is energized periodically by horizontal window pulses such that the signal stored therein represents the center picture signal. Following the close of the vertical window signal, the sample one shot 156 is triggered to provide a sample pulse to sample/hold circuit 48 or 50. This causes the information in the integrator to be transferred to either one or the other of the sample/hold circuits. The falling edge of the sample/hold pulse triggers dump one shot 172 which causes the storage element of the integrator 118 to be dumped, thus preparing it for the next presented signal. The output of dump one shot 172 triggers clock one shot 174 which is directed to AND gate 176. Since the output of flip-flop 158 is now low, AND gate 176 is disabled, thus blocking the clock pulse. Shortly thereafter, the vertical drive signal pulses once again, triggering flip-flop 158 and enabling the early switch. Since ring counter 184 triggers on falling edges it is not triggered by this transition of flip-flop 158. For this reason, the same video switch is energized which was energized in the previous field. Once again the vertical window, sample one shot, dump one shot and clock one shot trigger in close sequence. This time, however, since the output of flip-flop 158 is high, the clock AND gate 176 is energized and the clock pulse appears at the clock output of the video control circuit. This clock pulse is directed to one of the three counters, 128, 130 or 132 through AND gates 140, 142 or 144 as shown in FIG. 7. Whether the counter so addressed responds to the clock pulse depends as previously described on the relative registration of the respective video signal. The automatic circuit thus continues cyclically centering the three video signals, thus providing automatic registration of the three signals and automatic calibration of the circuit as well.

Either horizontal or vertical centering can be achieved through use of the apparatus described, the only substantive difference being that different first and second delays must be provided. For horizontal centering the first delay should be a fraction of time required for the scan of a single horizontal line; for vertical centering the first delay should be approximately equal to the time required for the scan of a single horizontal line. In each case, of course, the second delay should be substantially twice the length of the first delay. If both horizontal and vertical centering are used, the two circuits may conveniently share a single video control circuit.

Although the invention has been described in conjunction with a preferred embodiment, it is to be appreciated that various modifications and arrangements of parts may be made without departing from the spirit and scope of the invention as defined by the appended claims.

What is claimed is:

1. Automatic centering apparatus for use with a video camera having means for providing at least first and second video signals and means responsive to a registration control signal for adjusting the registration of said signals, said centering apparatus comprising:
    first delay means responsive to said first video signal for delaying said signal by a first amount to provide a first delayed signal;
    second delay means responsive to said second video signal for delaying said signal by a second amount substantially twice the length of said first amount to provide a second delayed signal;
    detector means comprising signal subtractor means for differentially combining said second video signal and said first delayed signal to provide a first difference signal and similarly combining said second delayed signals and said first delayed signal to provide a second difference signal, signal clipper means responsive to said first and second difference signals for selectively limiting the amplitudes thereof to respectively provide first and second clipped signals, and integrator means responsive to said first and second clipped signals for respectively integrating the amplitudes thereof to provide first and second detector output signals; and, means responsive to said first and second detector output signals for providing said registration control signal and for changing said registration control signal in response to the difference between said detector output signals.

2. Automatic centering apparatus as set forth in claim 1 and wherein said means responsive to said first and second detector output signals comprises comparator means responsive to said first and second detector input signals for comparing the amplitudes thereof to provide first and second command signals when the difference between said detector output signals respectively exceeds a given positive or negative amount, and first output means for providing said registration control signal and responsive to said first and second command signals for respectively increasing or decreasing the amplitude of said registration signal in response thereto.

3. Automatic centering apparatus as set forth in claim 2 wherein said first output means comprises digital clock means providing periodic clock pulses, digital up/down counter means for counting said clock pulses in a first direction in response to said first command signal and in a second direction in response to said second command signal for providing a digital output indicative of the cumulative result of such count, and digital to analog converter means responsive to said digital output for providing an analog output corresponding to said digital output and serving as said registration control signal.

4. Automatic centering apparatus for use with a video camera having means for providing at least first and second video signals and means responsive to a registration control signal for adjusting the registration of said signals, said centering apparatus comprising, detector means having first and second signal inputs for providing a detector output indicative of the misregistration between said first and second signal inputs, first delay means responsive to said first video signal for delaying said signal by a first amount to provide a first delayed signal serving as said first signal input to said detector means second delay means responsive to said second video signal for delaying said signal by a second amount substantially twice the length of said first amount to provide a second delayed signal, gating means responsive to said second delayed signal and said second video signal for selectively gating first one and then the other of said signals onto the output of said gating means to provide a gated signal thereon, said gated signal serving as said second signal input of said detector means such that the output of said detector means first indicates the misregistration between said first delayed signal and said second delayed signal and then indicates the misregistration between said first delayed signal and said second video signal, and means responsive to said detector output for providing said registration control signal and for changing said control signal in accordance with the difference between the two indicative outputs of said detector means.

5. Automatic centering apparatus for use with a video camera having means for providing at least first and second video signals and means responsive to a registration control signal for adjusting the registration of said signals, said centerin apparatus comprising:

first delay means responsive to said first video signal for delaying said signal by a first amount to provide a first delayed signal;

second delay means responsive to said second video signal for delaying said signal by a second amount substantially twice the length of said first amount to provide a second delayed signal;

detector means responsive to said first delayed signal and said second video signal to provide a first detector output signal indicative of the misregistration therebetween and further responsive to said first delayed signal and said second delayed signal to provide a second detector output signal indicative of the misregistration therebetween;

means responsive to said first and second detector output signals for providing said registration control signal and for changing said registration control signal in response to the difference between said detector output signal;

gating means interposed between said signal detector means on the one hand and said second video signal and said second delayed signal on the other hand, said gating means having a single output connected to said detector means for sequentially gating said second video signal and then said second delayed signal to said signal detector means along said single output in accordance with the state of a periodic gating signal; and, delay control means for providing said gating signal.

6. Automatic centering apparatus for use with a video camera having a drive signal comprised of a periodic sequence of drive pulses, said centering apparatus comprised as set forth in claim 5 and wherein said delay control means is synchronized with said drive signal to the point where the output of said gating means responds to each of said second video and second delayed signals for a time substantially corresponding to an integral number of intervals between successive said drive pulses.

7. Automatic centering apparatus as set forth in claim 6 and wherein said detectors means has a single output line connected to said comparator means and wherein said detector means responds to the output of said gating means and to said first delayed signal to provide on its output line said first detector output signal and then said second detector output signal in timed relation with said periodic gating signal.

8. Automatic centering apparatus as set forth in claim 7 and wherein said comparator means comprises first sample and hold means responsive to said first detector output signal for sampling the amplitude thereof and sustaining said amplitude at the output of said first sample and hold means, second sample and hold means responsive to said second detector output signal for sampling the amplitude thereof and sustaining said amplitude at the output of said second sample and hold means, and range comparator means responsive to the outputs of said first and second sample and hold means for providing said first command signal when the output of said first sample and hold means exceeds the output of said second sample and hold means by a first fixed amount and for providing said second command signal when the output of said second sample and hold means exceeds the output of said first sample and hold means by a second fixed amount.

9. Automatic centering apparatus as set forth in claim 8 and further comprising
a plurality of video switches interposed between each of said video signals save one and said first delay means, the output of all said switches being commonly connected to said first delay means in place of said first video signal, and wherein the remaining one of said video signals serves as said second video signal, said switches each being energizable for selectively gating said each of said video signals save one to said first delay means in accordance with respective first control signals directed to each of said switches,
a plurality of second output means commonly connected to the output of said comparator means for providing respective analog outputs, each said second output means being responsive to the outputs of said comparator means only upon the occurrence of respective second control signals, and
video control means for providing said first and second control signals in timed relation to one another whereby the respective analog outputs of said plurality of second output means each responds to the misregistration of a respective said video signal and further wherein said analog outputs are each adapted to provide respective registration signals for the respective said video signal.

10. Automatic centering apparatus as set forth in claim 9, wherein each of said plurality of second output means comprises clock means responsive to a respective said second control signal for providing clock pulses periodically in accordance with said respective second control signal, digital up/down counter means for counting said clock pulses in a first direction in response to said first command signal and in a second direction in response to said second command signal for providing a digital output indicative of the cumulative result of such count, and digital to analog converter means responsive to said digital output for providing said respective analog output.

11. Automatic centering apparatus as set forth in claim 10 wherein said one of said video signals in addition to serving as said second video signal is further directed to said first delay means through an additional one of said video switches and wherein said centering apparatus has a corresponding additional one of said output means and a corresponding additional one of said second control signals for fixing a corresponding coincidence of operation of said additional output means and said additional video switch whereby the analog output of said additional output means serves as a calibration signal.

12. Automatic centering apparatus as set forth in claim 11 and further comprising variable attenuation means interposed between said second video signal and said gating means and responsive to said calibration signal for providing a signal to said gating means whose gain is controlled by said calibration signal whereby said centering apparatus is automatically calibrated.

13. Automatic centering apparatus as set forth in claim 12 wherein said delay control means and said video control means are synchronized to the point that each of said video switches is energized for one full cycle of said gating means.

14. Automatic centering apparatus as set forth in claim 13 wherein said integrator means includes storage means exclusively responsive to the current flowing into said integrator means from said clipper means for providing stored signals serving as said detector output signals.

15. Automatic centering apparatus as set forth in claim 14 wherein said detector means further comprising window gating means interposed between said clipper means and said integrator means for selectively blocking current flow therebetween in accordance with a window gating signal, and window control means for providing said window gating signal during intervals when said video signals carry video information corresponding to the edge of the picture being viewed by said camera.

16. Automatic centering apparatus as set forth in claim 15 wherein said integrator means further comprises dumping means connected to said storage means for periodically reducing said stored signal to a minimal value in accordance with a dump signal, and dump signal means responsive to said drive signal for providing said dump signal in timed relation therewith.

17. Automatic centering apparatus as set forth in claim 16 and further comprising clamping means interposed between each of said video signals and its respective said video switch for uniformly correcting the D.C. amplitudes of said video signals with respect to a reference black level thereof.

* * * * *